United States Patent [19]
Field et al.

[11] 3,928,477
[45] Dec. 23, 1975

[54] PRODUCTION OF PHENOLS FROM DECOMPOSITION OF AROMATIC HYDROPEROXIDES

[75] Inventors: Peter Graham Spencer Field, Bebington; David Anthony Lock, Heswall, both of England

[73] Assignee: Burmah Oil Trading Limited, Swindon, England

[22] Filed: Nov. 8, 1973

[21] Appl. No.: 413,967

[30] Foreign Application Priority Data
Nov. 8, 1972 United Kingdom............... 51630/72

[52] U.S. Cl.... 260/621 C; 260/429 CY; 260/429.9; 260/438.1; 260/438.5 R; 260/439 CY; 260/593 A; 260/599; 260/601 R; 260/612 R; 260/612 D; 260/613 R; 260/613 D; 260/619 R; 260/620; 260/622; 260/623 R; 260/624 R; 260/625
[51] Int. Cl.². ........................................ C07C 37/08
[58] Field of Search........ 260/621 C, 593 A, 622 R, 260/623 R, 624 R, 625, 599, 601 R, 612 R, 612 D, 613 R, 613 D, 619 R, 620

[56] References Cited
UNITED STATES PATENTS

| | | | |
|---|---|---|---|
| 2,626,281 | 1/1953 | Jons.................................. | 260/621 C |
| 2,628,984 | 2/1953 | Aller et al....................... | 260/621 C |
| 2,668,859 | 2/1954 | Lyon................................... | 260/593 |
| 2,683,751 | 7/1954 | Filar................................ | 260/621 C |
| 3,187,052 | 6/1965 | Nelson et al........................ | 260/593 |

OTHER PUBLICATIONS
Berkman et al., "Catalysis, Inorganic and Organic," pp. 40, 41, 154, 155, 222–233, 312–329, 344–351, 370–381, 641–653, (1940).

*Primary Examiner*—Norman Morgenstern
*Attorney, Agent, or Firm*—Browdy and Neimark

[57] ABSTRACT

Phenols are prepared by decomposing aromatic organic hydroperoxides in the presence of a metal complex containing the grouping

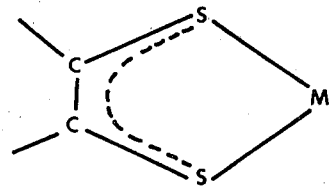

wherein M is a metal atom having a co-ordination number of at least 2 and recovering the phenols from the decomposition products.

21 Claims, No Drawings

PRODUCTION OF PHENOLS FROM DECOMPOSITION OF AROMATIC HYDROPEROXIDES

This invention relates to a process for the production of phenols by decomposing aromatic organic hydroperoxides.

Phenol is commonly produced on a large scale by decomposing cumene hydroperoxide in the presence of an acid catalyst, for example, sulphuric acid or perchloric acid. The mechanism of the reaction, when catalysed by sulphuric acid is believed to be as follows:

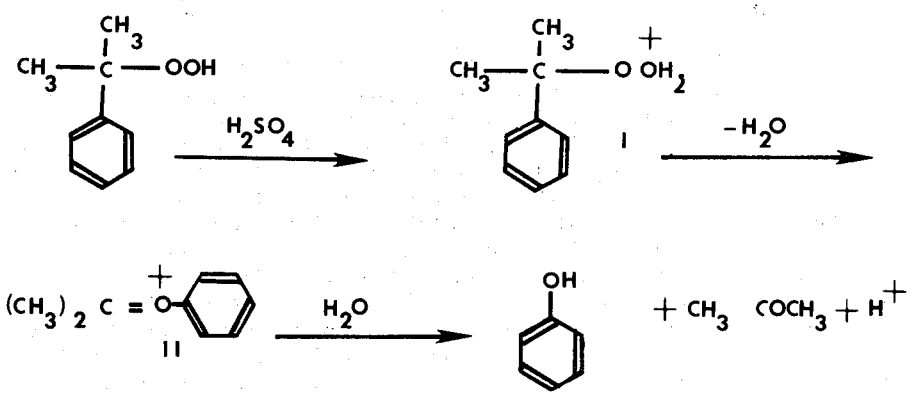

Thus the cumene hydroperoxide is protonated to form an intermediate I which loses water and rearranges to form the intermediate II which reacts with water to yield phenol and acetone.

The hydroperoxide is normally formed by autoxidation of cumene (isopropylbenzene) and the latter can be formed by alkylation of benzene with propylene. Other tertiary aralkyl hydroperoxides can be decomposed in the presence of acid catalysts to yield substituted phenols. Thus, for example, para-cresol has been prepared by decomposing para-cymene hydroperoxide.

While the use of conventional acid catalysts to catalyse the decomposition of tertiary aralkyl hydroperoxides to phenols and ketones has led to reported yields of up to about 90 wt % phenol and 80 wt. % acetone, based on the hydroperoxide there is always the desire to obtain still higher yields. It is also desirable to avoid the disadvantage, found with such catalysts, that a proportion of the hydroperoxide starting material tends to be converted into very undesirable contaminants by means of competing side reactions. Thus, it is common for the product obtained when cumene hydroperoxide is decomposed in the presence of conventional acid catalysts to contain a proportion of high molecular weight resinous materials and other high boiling materials produced in the reaction. The need to remove these materials can necessitate further process stages and can complicate the recovery of the phenol.

Furthermore, it has not hitherto been considered commercially practicable to effect the decomposition of hydroperoxides other than tertiary aralkyl hydroperoxides, since firstly the yields of phenols produced have been commercially unattractive and secondly, as in the case of tertiary hydroperoxides, undesirable quantities of high molecular weight by-products are produced when conventional acid catalysts are used. Thus, for example, a yield of only 37 wt. % of phenol is reported when ethylbenzene hydroperoxide is decomposed in the presence as catalyst of sulfuric acid.

A further disadvantage of the use of conventional acid catalysts is that it is generally necessary to construct the plant used to carry out the decomposition from corrosion-resistant materials and this can result in high capital costs. Furthermore, it is generally necessary to remove or neutralise the acid catalyst before the decomposition products are processed to recover phenol.

We have now discovered a novel catalyst for this process the use of which raises the yields of phenols or substituted phenols from secondary aralkyl hydroperoxides to a level which makes this route to the phenols or substituted phenols commercially attractive. Use of this catalyst also reduces the quantity of high molecular weight by-products formed for both secondary and tertiary hydroperoxides. Also, since the catalyst is not strongly acidic in nature, the vessels used for carrying out the decomposition need not be constructed of such corrosion-resistant materials as are required when conventional acid catalysts are used and there is also no need to remove the catalyst before the phenols are recovered, although this may be effected if desired.

According to the present invention, there is provided a process for producing a phenol or a substituted phenol by decomposing an aromatic organic hydroperoxide, which process comprises effecting the decomposition in the presence of a catalyst comprising a metal complex containing the grouping.

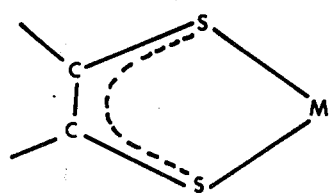

wherein M is a metal atom having a co-ordination number of at least 2, and recovering the required phenol or substituted phenol from the decomposition products.

Preferably, the metal complex has the formula:

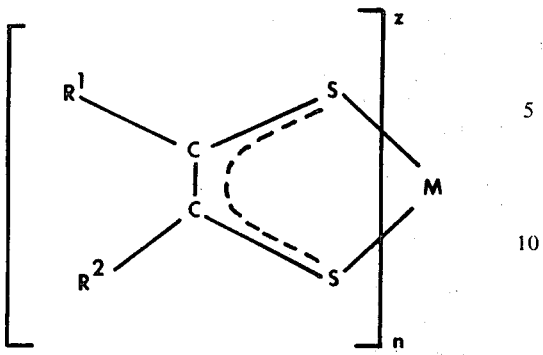

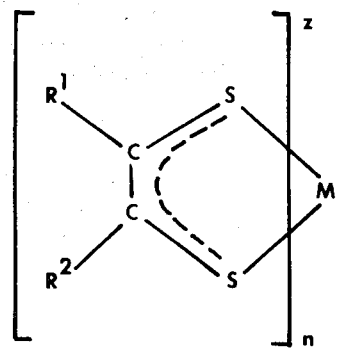

wherein n is 1, 2 or 3; z represents the formal charge of the complex and is 0,−1 or −2; and R¹ and R², which may be the same or different, represent substituted or unsubstituted hydrocarbyl groups, or, together with the carbom atoms to which they are attached form an alicyclic ring, for example a cyclohexane ring as in bis(1,2-cyclohexanedithionato) nickel II.

It has been observed surprisingly that by using the process of the invention, increased yields of phenols may be obtained by decomposing secondary aromatic organic hydroperoxides than when conventional acid catalysts are used. Thus, for example, yields in excess of 90 wt % of phenol have been obtained by decomposing ethylbenzene hydroperoxide in accordance with the process of the invention. Furthermore, when aromatic organic hydroperoxides in general are decomposed in accordance with the invention, significantly lower quantities of high molecular weight by-products are formed than when conventional acid catalyst are used.

Metal complexes are known having the structure set forth above. The preparation and characterisation of such complexes has been described in various publications, for example The Journal of the American Chemical Society, 84, pages 3221 and 3596–97 (1962); bid, 87, pages 1483–89 (1965); Inorganic Chemistry, 2, pages 1227–1232 (1963); Discussions of the Faraday Society, 46, (1968) and Israel Journal of Chemistry, 8, pages 125–139 (1970). In addition to the metal atom and the ligand or ligands represented by the partial formula:

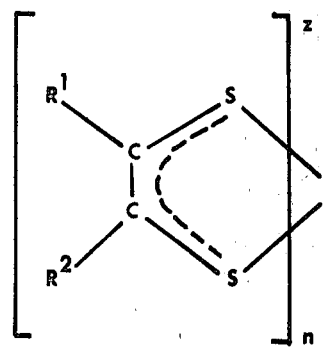

the metal complex may contain additional ligand attached to the metal atom, and where z is −1 or −2, the metal complex may be associated with cations. For example, as discussed in The Journal of the American Chemical Society, 87 at page 1484 (left hand column) a metal complex of the formula:

may be reacted with nitrogen bases, such as, for example, pyridine, piperidine or hydrazine, to produce salts in which the complexed metal constitutes the anion and the nitrogen base constitutes the cation. Alternatively, arsines or phosphines, or donor compounds containing S, O or Se may be used in place of the nitrogen base.

Preferred amongst the hydrocarbyl groups satisfying R¹ and R² are aryl groups (including alkaryl groups, the alkyl substituents of which preferably contain from 1 to 6 carbon atoms) and particularly phenyl groups. The term "hydrocarbyl" is also to be understood to include aliphatic groups, e.g. alkyl and cycloalkyl groups. Thus, for example, R¹ and R² may be alkyl groups, for example alkyl groups containing from 1 to 8 and preferably 1 to 4 carbon atoms.

If desired, the hydrocarbyl groups may be substituted, e.g. by halogen atoms as in, for example, chloro- and/or fluoro-substituted phenyl groups and chloro- and/or fluoro-substituted methyl groups, or, e.g. alkoxy groups, which preferably contain from 1 to 6 carbon atoms. A particularly preferred substituted alkyl group is trifluoromethyl.

Further examples of substituted hydrocarbyl groups are groups providing the carbon and sulphur atoms of a grouping:

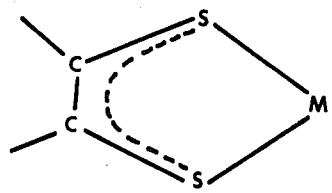

in which M is a metal. In such cases it will be appreciated that a single molecule of the metal complex may contain more than one metal atom, which may be the same or different.

The catalyst may conveniently be prepared according to the procedure described on page 1487 of Volume 84 (1962) of the Journal of the American Chemical Society, which is broad terms comprises substituting sulphur atoms for the oxygen atoms of the hydroxyl and keto groups of an α-hydroxy Ketone, reacting the sulphur-containing product so produced with a salt containing the metal M as a cation or as a complex anion, recovering a solid containing a metal complex containing the grouping:

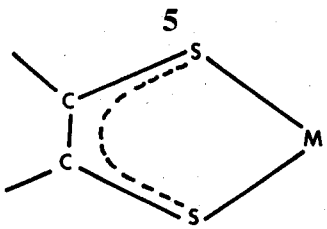

and extracting the complex with an organic solvent.

Thus, for example, when it is desired to prepare catalyst comprising bis-dithiobenzil nickel, benzil and a sulphide of phosphorus are reacted in a suitable solvent, for example dioxan and the resultant dark brown solution, after filtering is heated under reflux with an aqueous solution of a nickel salt, e.g. nickel chloride. The resultant product mixture, on cooling, yields a black crystalline solid product which is purified using soxhlet extraction using, for example, methylene dichloride as solvent.

Complexes of the class including those forming the catalysts of the present invention are generally most conveniently obtained from metals of the transition series. Preferred metals for the catalyst are those found in groups 5, 6, 7 and 8 of the Periodic Table, particularly group 6, 7 and 8 and especially group 8. Examples of such metals are zinc, copper, cobalt, iron, chromium, platinum, nickel and palladium.

The aromatic organic hydroperoxide starting material employed in the process of the present invention may be an aryl mono-alkyl hydroperoxide, which preferably contains from 2 to 24, more preferably 2 to 16 and especially 2 to 12, carbon atoms in the alkyl moiety. Examples of such hydroperoxides are ethyl benzene hydroperoxide and cumene hydroperoxide. Alternatively, a substituted -aryl alkyl hydroperoxide may be used, i.e. a hydroperoxide in which the aryl group bears one or more substituents e.g. selected from halogen atoms and alkyl, alkoxy and nitro groups. Decomposition of such hydroperoxides produces a correspondingly substituted phenol. In yet another alternative a dialkylaryl dihydroperoxide may be used, i.e. a compound having an aryl nucleus substituted by two alkyl-hydroperoxide groups, in which case a dihydric phenol will result from the decomposition. Such hydroperoxides may likewise bear one or more substituents thus enabling correspondingly substituted dihydric phenols to be obtained.

The nature of the co-product aldehyde or ketone will depend on the structure of the hydroperoxide. Generally, primary and secondary aralkyl hydroperoxides decompose to form phenols and aldehydes and tertiary aralkyl hydroperoxides decompose to form phenols and ketones.

The decomposition of the hydroperoxide in the presence of the catalyst proceeds very readily and may be carried out under a wide variety of reaction conditions. Preferably the reaction temperature is not permitted to reach too high a level since this could lead to the thermally initiated decomposition of the hydroperoxide, producing undesirable by-products, and in an extreme case might lead to decomposition becoming too rapid and uncontrollable, and potentially explosive. A reaction temperature of from ambient to 180°C is preferred, more preferably ambient to 150°C and especially 100°C to 140°C. The decomposition of the hydroperoxide may be sufficiently exothermic to make it desirable to control the reaction temperature in order to maintain it at the desired level. Conventional techniques can be used for this purpose, such as external cooling and/or regulating the rate at which the hydroperoxide is brought into contact with the catalyst. A particularly useful technique for regulating the reaction temperature is to subject the reaction mixture to a fairly high temperature, such as 140°C to 150°C, for a short period, e.g. 1 or 2 minutes, to initiate the decomposition of the hydroperoxide and thereafter allowing the reaction to proceed to completion at a lower temperature maintained by external cooling.

Preferably the aldehyde or ketone co-product of the decomposition is continuously removed during the decomposition reaction in order to reduce the possibility of unwanted side reactions between the aldehyde or ketone and other components of the decomposition product. Thus, for example, the aldehyde or ketone may be distilled off and collected in a condenser. Removal of the aldehyde or ketone may be assisted by conducting the decomposition under reduced pressure, but generally the pressure at which the decomposition is carried out is not narrowly critical and conveniently atmospheric pressure may be used, particularly in the case where the co-product aldehyde or ketone is sufficiently volatile at the reaction temperature to be distilled off at atmospheric pressure.

The time required for completion of the reaction will depend, inter alia, on the reaction temperature but even at very low reaction temperatures is normally not more than 3 or 4 hours. At preferred reaction temperatures the decomposition will in most cases be completed within, e.g. 5 to 50 minutes at 150°C or within 1½ to 2 hours, usually not more than 1 hour, at 80°C to 120°C.

In order to moderate the decomposition, the process of the present invention is generally carried out in the presence of an inert solvent, i.e. a solvent which does not react with the hydroperoxide or its decomposition products. Thus in the case of a hydroperoxide which is solid at the reaction temperature it is preferred to dissolve the hydroperoxide in an inert solvent. The inert solvent can also be used if desired even when the hydroperoxide is liquid at the reaction temperature used. If used the inert solvent is preferably present in an amount such as to provide a solution containing from 1 to 50%, more preferably 5 to 25%, by weight of the hydroperoxide. Examples of inert solvents include benzene, toluene, xylene, ethylbenzene, chlorobenzene, nitrobenzene and dimethyl formamide.

Very small quantities of the catalyst, for example about 0.0001 mole % based on the amount of the hydroperoxide may be successfully employed in the process of the present invention. Larger quantities can also be used. However, this is unnecessary and wasteful and in some cases large quantities of catalyst may be detrimental. Accordingly, in a preferred embodiment of the invention the catalyst is employed in an amount of from 0.00001 to 0.5 mole %, based on the amount of the hydroperoxide.

The decomposition is preferably carried out in the presence of small quantities of water to moderate the decomposition reaction, for example from 0.01 to 2.0 wt % based on the amount of hydroperoxide, preferably from 0.05 to 0.5 wt % and most preferably from 0.1 to 0.2 wt %.

The hydroperoxides used in the process of the present invention may be prepared by the usual methods, such as autoxidation of an alkyl aryl compound. The alkyl aryl starting materials for the autoxidation may also be prepared by the usual methods such as alkylation of aryl compounds with an olefin.

The phenol and the aldehyde or ketone produced in accordance with the process of the invention may be recovered by conventional methods, for example by fractional distillation and in general the purification techniques used in the conventional acid-catalysed process may be employed, although of course the process steps concerned with the removal of the catalyst may be omitted.

The invention will now be illustrated by the following examples:

Bis (dithio-benzil) nickel and bis (dithio-benzil) palladium catalysts were prepared as follows:

A. Bis (dithiobenzil) nickel catalyst i. Preparation of thioester

Benzil (100g) and $P_2S_5$ (150g) were mixed together in 1,4-dioxan (1000 ml) in a 2 liter round-bottomed flask and heated on a boiling water bath for four hours.

Mixing was effected by use of an overhead stirrer unit (collapsing link type). The resultant solution was dark brown in colour, and yielded very little solid material on cold filtration.

ii. Preparation of complexes

Nickel chloride hexahydrate (5g) was dissolved in water (35 ml) and added to a 500 ml portion of the thioester solution prepared in (i) above in a 1 liter round-bottomed flask.

The mixture was heated on a boiling water bath under a reflux condenser for 2 hours.

Overnight cooling gave rise to a black crystalline precipitate.

iii. Purification

The complex was purified by extraction for 20 hours using a Soxhlet apparatus with dichloromethane (500 ml) as solvent.

A crystalline material was obtained on cooling from the extracted liquor without reduction of the liquid volume.

Analysis

The nickel complex was subjected to C,H analysis using a Perkin Elmer 240 elemental analyser and the following results obtained:

|  | C% | H% |
|---|---|---|
| Theoretical | 61.89 | 3.71 |
| Found | 61.49 | 3.56 |
|  | 61.88 | 3.55 |

B. Bis (dithiobenzil) palladium catalyst

This catalyst was prepared in an identical manner to that described in Preparation A, except that potassium hexachloropalladite was used in step (ii).

The ethylbenzene hydroperoxide used in the following Examples was prepared by reaction of α-phenyl ethanol and 95% hydrogen peroxide in the presence of a small amount of concentrated sulphuric acid and typically contained from 0.01 to 2.0 wt % of water based on the amount of hydroperoxide. In Example 10(B) substantially anhydrous ethylbenzene hydroperoxide was employed, which was prepared by distillation to remove water and collecting the fraction boiling between 46°C and 48°C at 0.1 mm Hg.

EXAMPLE 1

Materials:

| Hydroperoxide: | Ethyl benzene hydroperoxide | 4g |
|---|---|---|
| Solvent: | Benzene | 25g |
| Catalyst: | Bis (dithio-benzil) nickel | 0.0055g |

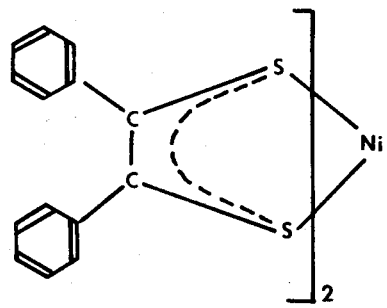

The hydroperoxide, solvent and catalyst were introduced into a glass pressure vessel of 120 ml capacity and the vessel then immersed in an oil bath at 150°C to initiate decomposition of the hydroperoxide. After 1½ minutes in the oil bath the vessel was removed and cooled in water for a further 10 minutes, during which time all the hydroperoxide was decomposed.

No detectable quantities of resinous materials were observed in the decomposition product.

The crude product was taken up in di-ethyl ether, previously dried over sodium, and the resulting solution extracted with 3 ten ml portions of aqueous 1N NaOH. The aqueous extract was separated, re-acidified with 2N $H_2SO_4$ and extracted with di-ethyl ether. The ether extract so obtained was dried over anydrous $MgSO_4$ and the ether removed to yield 2.58 grams of the final product which was a dark liquid. The final product was identified as substantially pure phenol by I.R. analysis, preparation of derivatives and mixed melting point determinations and recovery was 95.2% based on the amount of hydroperoxide used.

EXAMPLE 2

Materials:

| Hydroperoxide: | Ethyl benzene hydroperoxide | 4g |
|---|---|---|
| Solvent: | Ethyl benzene | 25g |
| Catalyst: | Bis (dithio-benzil) nickel | 0.0055g |

The same procedure was followed as in Example 1, except in that the pressure vessel was heated on the oil bath for 2½ minutes and then allowed to cool in air.

During the cooling period, 97% of the hydroperoxide decomposed and the quantitative determination, by gas liquid chromatography, of the resulting crude product showed a yield of phenol of 92% based on the hydroperoxide used.

No detectable quantities of resinous materials were observed in the decomposition product.

EXAMPLE 3

Materials:

| Hydroperoxide: | Cumene hydroperoxide | 5.06g |
|---|---|---|
| Solvent: | Benzene | 25g |
| Catalyst: | Bis (dithio-benzil) nickel | 0.0055g |

The same procedure was followed as in Example 1, except in that the pressure vessel was heated on the oil bath at a temperature of 120°C for 2 minutes and then allowed to cool in air. Yield of phenol, determined in the same manner as in Example 2, was 90% based on the hydroperoxide used and the decomposition product contained less high-molecular weight by-product than the products obtained by decomposing cumene using sulphuric acid as catalyst.

EXAMPLE 4

Materials:

| Hydroperoxide: | Ethyl benzene hydroperoxide | 4g |
| --- | --- | --- |
| Solvent: | Benzene | 25g |
| Catalyst: | Bis (dithio-benzil) iron" | 0.0053g |

The same procedure was followed as in Example 1, and the yield of phenol, determined in the same manner as in Example 2, was 90% based on the hydroperoxide used.

No detectable quantities of resinous materials were observed in the decomposition product.

EXAMPLE 5

Materials:

| Hydroperoxide: | Ethyl benzene hydroperoxide | 2.82 parts by weight |
| --- | --- | --- |
| Solvent: | Benzene | 22 parts by weight |
| Catalyst: | Bis (dithio-benzil) nickel | 0.001 parts by weight (10,000:1) |

The hydroperoxide, solvent and catalyst were introduced into a glass pressure vessel and heated to 135°C to initiate decomposition of the hydroperoxide.

Heating was continued for 10 minutes and the vessel was then rapidly cooled to room temperature.

During the reaction period 97% of the hydroperoxide decomposed, and quantitative determination of phenol by gas-liquid chromatography gave 86% selectivity, and no detectable quantities of resinous materials were observed in the decomposition product. Phenol and acetaldehyde were recovered by fractional distillation.

EXAMPLE 6

Materials:

| Hydroperoxide: | Benzhydryl hydroperoxide | 361 parts by weight |
| --- | --- | --- |
| Solvent: | Ethylbenzene | 2200 parts by weight |
| Catalyst: | Bis (dithiobenzil) nickel | 0.64 parts by weight |

The hydroperoxide, solvent and catalyst were introduced into a vessel fitted with a double surface condenser and the vessel immersed in an oil bath at 110°C.

The vessel was heated for 16 minutes, and then rapidly cooled to room temperature.

During the reaction 99% of the hydroperoxide was decomposed, and the selectivity to phenol (GLC) was 95%. No detectable quantities of resinous materials were observed in the reaction product. Phenol and benzaldehyde were recovered by distillation.

EXAMPLE 7

Materials:

| Hydroperoxide: | Ethylbenzene hydroperoxide | 282 parts by weight |
| --- | --- | --- |
| Solvent: | Ethylbenzene | 2200 parts by weight |
| Catalyst: | Bis (dithio-benzil) nickel | 0.50 parts by weight (2000:1) |

The reaction was performed as in Example (6) except that the reaction temperature was 120°C and the reaction time was 8 minutes. 99% of the hydroperoxide was decomposed and quantitative determination of phenol gave 85% selectivity. No detectable quantities of resinous materials were observed in the reaction product.

EXAMPLE 8

Materials:

| Hydroperoxide: | Ethylbenzene hydroperoxide | 3 parts by weight |
| --- | --- | --- |
| Solvent: | Ethylbenzene | 22 parts by weight |
| Catalyst: | Bis (dithio-benzil) palladium | 0.0065 parts by weight (2000:1) |

The reaction was carried out as in Example 5 except that the reaction time was 20 minutes.

During the reaction 99% of the hydroperoxide was decomposed and quantitative estimation of the phenol product gave 85% selectivity. No detectable quantities of resinous materials were observed in the decomposition product.

EXAMPLE 9

Materials:

| Hydroperoxide: | Ethylbenzene hydroperoxide | 2 parts by weight |
| --- | --- | --- |
| Solvent: | Ethylbenzene | 22 parts by weight |
| Catalyst: | Bis (dithio-benzil) palladium | 0.0009 parts by weight |

The reaction was carried out as in Example 5 except that the temperature was 150°C. and the reaction time was 8 minutes. A pressure of 65 psig was maintained in the pressure vessel.

During the reaction 99% of the hydroperoxide was decomposed and quantitative estimation of the phenol product gave 90% selectivity. No detectable quantities of resinous materials were observed in the decomposition product.

EXAMPLE 10

A.

Materials:

| Hydroperoxide: | Ethylbenzene hydroperoxide | 3 parts by weight |
| --- | --- | --- |
| Solvent: | Ethylbenzene | 22 parts by weight |
| Catalyst: | Bis (dithio-benzil) nickel | 0.006 parts by weight |

The reaction was carried out as in Example 5 except that the temperature was 120°C and the reaction time was 30 minutes. A pressure of 45 psig was recorded during the reaction.

During the reaction 99.5% of the hydroperoxide was decomposed and quantitative estimation of the phenol product gave 89.5% selectivity. No detectable quantities of resinous materials were detected in the decomposition product.

B.

Materials:

| Hydroperoxide: | Ethylbenzene hydroperoxide (dehydrated) | 3 parts by weight |
|---|---|---|
| Solvent: | Ethylbenzene | 22 parts by weight |
| Catalyst: | Bis (dithio-benzil) nickel | 0.0058 parts by weight |

The reaction was carried out as in Example 5 except that the temperature was 120°C. The decomposition was essentially complete after a reaction time of only 5 minutes and a pressure of 80 psig was recorded during the reaction.

No residual ethylbenzene hydroperoxide was detected in the decomposition product and quantitative estimation of the phenol product gave 89% selectivity.

In addition to giving high yields of phenol, the procedure of the Examples did not result in the production of significant quantities of high molecular weight by-products. Thus less than 5 wt % of products having a molecular weight in excess of 100 could be detected by high temperature GLC and these results were confirmed by GLC/mass spectrometry measurements.

We claim:

1. A process for producing a phenol or a substituted phenol by decomposing an aromatic hydroperoxide, which process comprises effecting the decomposition at a temperature in the range from ambient temperature to 180°C. in the presence of from 0.00001 to 0.5 mole percent, based on the amount of the hydroperoxide of a catalyst comprising a metal complex represented by the formula:

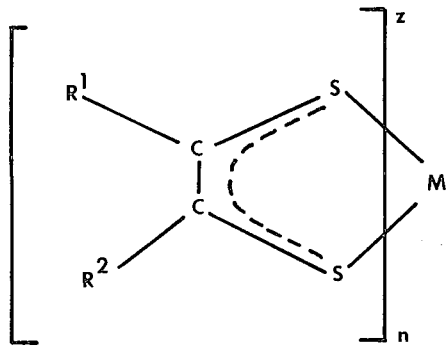

wherein $n$ is 1, 2 or 3; M is a metal of the transition series capable of forming a complex in which it has a coordination number of at least 2; $z$ represents the formal chanrge on the complex and is 0, −1 or −2; and $R^1$ and $R^2$, which may be the same or different, represent hydrocarbyl groups containing up to 12 carbon atoms which may be unsubstituted, substituted by one or more halogen atoms, alkoxy groups containing up to 6 carbon atoms or atoms providing a grouping:

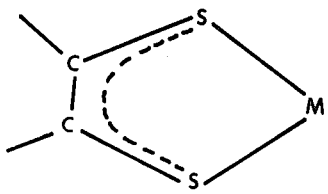

or, together with the carbon atoms to which they are attached, form an alicyclic ring, and recovering the required phenol or substituted phenol from the decomposition products.

2. A process according to claim 1 in which the hydroperoxide is a secondary hydroperoxide.

3. A process according to claim 2 in which the hydroperoxide is a secondary aralkyl hydroperoxide.

4. A process according to claim 3 in which the hydroperoxide is ethylbenzene hydroperoxide.

5. A process according to claim 1 in which the hydroperoxide is cumene hydroperoxide.

6. A process according to claim 1 in which the metal is selected from the group consisting of transition metals of group 5, 6, 7 and 8 of the Periodic Table.

7. A process according to claim 1, in which the metal is selected from the group consisting of nickel, palladium, iron and cobalt.

8. A process according to claim 1 in which $n$ is 2.

9. A process according to claim 1 in which $R^1$ and $R^2$ are each aryl groups.

10. A process according to claim 9 in which $R^1$ and $R^2$ are each phenyl groups.

11. A process according to claim 1 in which the metal complex is bis-dithiobenzil nickel represented by the formula:

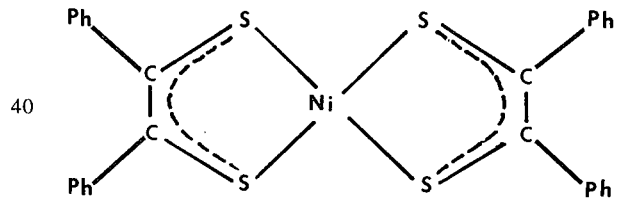

12. A process according to claim 1 in which the metal complex is bis-dithiobenzil palladium represented by the formula:

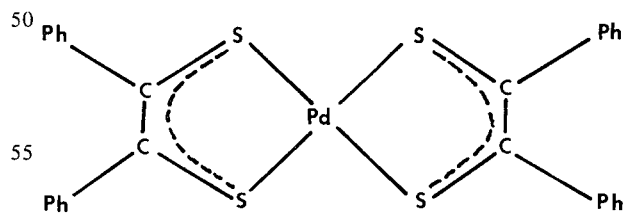

13. A process according to claim 1 in which the decomposition is moderated by the presence of water.

14. A process according to claim 1 in which the decomposition is carried out in the presence of from 0.01 to 2.0 wt. % of water based on the amount of hydroperoxide.

15. A process according to claim 14 in which the decomposition is carried out in the presence of from 0.05 to 0.5 wt. % of water based on the amount of hydroperoxide.

16. A process according to claim 1 in which the decomposition is effected at a temperature in the range from 80°C to 120°C.

17. A process according to claim 1 in which the decomposition is carried out with the organic hydroperoxide in solution in an organic solvent which is inert to the organic hydroperoxide and to the decomposition products.

18. A process according to claim 17 in which the solution contains from 8 to 30 wt. % of the organic hydroperoxide.

19. A process according to claim 17 in which the solvent is benzene, toluene, xylene, ethylbenzene, chlorobenzene, nitrobenzene or dimethylformamide.

20. A process in accordance with claim 1, wherein $R^1$ and $R^2$, which may be the same or different, represent aryl, alkaryl with alkyl substituents of $C_{1-6}$ or alkyl or cycloalkyl with $C_{1-8}$ which may be unsubstituted, substituted by one or more halogen atoms, alkoxy groups containing up to 6 carbon atoms or atoms providing a grouping:

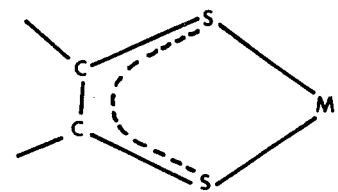

or together with the carbon atoms to which they are attached, form an alicyclic ring.

21. A process in accordance with claim 20, wherein said aryl or alkaryl group comprises phenyl of alkylphenyl.

* * * * *